June 3, 1952 C. T. ZIMMERMANN 2,598,740
SLICING MACHINE

Original Filed May 22, 1946 10 Sheets-Sheet 5

INVENTOR
CARL T. ZIMMERMANN
BY
ATTORNEY

June 3, 1952 C. T. ZIMMERMANN 2,598,740
SLICING MACHINE
Original Filed May 22, 1946 10 Sheets-Sheet 6

INVENTOR
CARL T. ZIMMERMANN
BY
ATTORNEY

June 3, 1952 — C. T. ZIMMERMANN — 2,598,740
SLICING MACHINE
Original Filed May 22, 1946 — 10 Sheets-Sheet 10

INVENTOR
CARL T. ZIMMERMANN
BY

ATTORNEY

Patented June 3, 1952

2,598,740

UNITED STATES PATENT OFFICE 2,598,740

SLICING MACHINE

Carl T. Zimmermann, Old Greenwich, Conn., assignor to Globe Slicing Machine Co., Inc., Stamford, Conn., a corporation of New York Original application May 22, 1946, Serial No. 671,468. Divided and this application July 6, 1949, Serial No. 104,682

2 Claims. (Cl. 146—102)

This invention relates to slicing machines in general and more especially to slicing machines of the gravity feed type in which the knife is disposed at an oblique angle to the vertical and the object holder, or chute, extends substantially vertical to the plane of the knife, and also at an oblique angle to the vertical to enable the article being cut automatically to descend by its own weight due to gravity as a slice is being cut from the lower end thereof.

Among the objects of the present invention, it is aimed to provide an improved slicing machine of the gravity feed type in which the space under the knife is entirely free to accommodate a tray or the like for receiving the slices as they are being cut, and provided with an electric motor which is disposed at the lower end of the knife and to one side of the free space in an enclosed casing, with the bracket or hanger for slidably supporting the article chute disposed to the rear of the motor, that is, with the motor disposed between the hanger and the lower end of the knife.

More specifically, the present invention aims to provide an improved slicing machine of the gravity feed type having an article holder or meat holder which can be readily adjusted or converted to support an article, such as a Bologna, while being sliced at various angles relative to the cutting plate, according to the desire of the customer.

It is still another object of the present invention to provide an improved slicing machine of the gravity feed type in which the control for adjusting the position of the gauge plate is disposed below the handle for manually reciprocating the article chute and preferably slightly to the left of the handle so that the operator may with facility manipulate the gauge plate control with his left hand while engaging the handle of the chute to reciprocate it with his right hand.

In the interest of assembly and ready repair, it is also an object of the present invention to provide a slice adjustment unit as a separable removable unit.

It is still another object of the present invention to provide an improved slicing machine of the gravity feed type having a guard for the knife that is readily removable without the use of tools to enable the operator to clean the knife whenever desired.

It is still another object of the present invention to provide an improved slicing machine of the gravity feed type having a guard for the knife that is yieldable upon engagement by the chute to enable large or wide pieces of meat to be cut which may call for extending the pieces of meat to and beyond the far end of the knife.

It is still another object of the present invention to provide an improved machine of the character described having a readily removable chute without the use of tools or the like, so that the attendant when it is desired to effect a particular slice, such as when derinding bacon, may with facility remove the chute and then again replace it and anchor it in operative position, all without the use of separate tools or the like.

It is still another object of the present invention to provide an improved machine of the character described having an improved sharpening unit including a honing and grinding wheel which may be brought into engagement with the cutting edge of the knife when it is desired to sharpen the same, including yieldable control means whereby the honing wheel will engage the knife edge first relative to the grinding wheel and will leave it last so as to prevent the formation of burrs and the like.

These and other features, capabilities and advantages of the invention will appear from the subjoined detail description of specific embodiments thereof illustrated in the accompanying drawings, in which.

In the embodiment shown in Figs. 1 to 17, inclusive, there is illustrated a main housing 1, a platform 2, a knife supporting frame 3 for the knife 4, a supporting bracket 5 for the gauge plate 6, a hanger 7 for the substance or meat carrying chute 8, and a frame 9 for the motor 10.

In the interest of assembly and repair of these several main parts, they all are associated with the main housing 1 as separable removable units and therefore will be described in the order named under the following headings: Housing and Platform; Knife and Associated Parts; Gauge Plate and Control Means; Chute and Hanger; Motor and Supporting Frame; and Modification of Knife Guard.

Housing and platform

The housing 1 consists essentially of a rear vertical wall 11, a short front vertical wall 12, a rearwardly inclined front wall 13 continuing upwardly from the front wall 12 and merging into the rounded upper wall portion 14 which in turn merges into the vertical rear wall 11. These walls 11, 12, 13 and 14 in the present instance, merge in the end walls 15. At the four inner corners of the housing in the present instance are provided the bosses 16, preferably to receive suitable cushioned plugs composed of rubber or the like, such as the plugs 17. The platform 2 preferably has a flange 18 extending down from its ends and front, and a downwardly extending flange 19 near its rear edge to receive screws 20 connecting the flange 19 to the lower end of the front wall 12. Preferably the front wall 12 has a recess or opening 21 therein to receive the rear free end 22 of the platform 2.

Figures 1, 2:
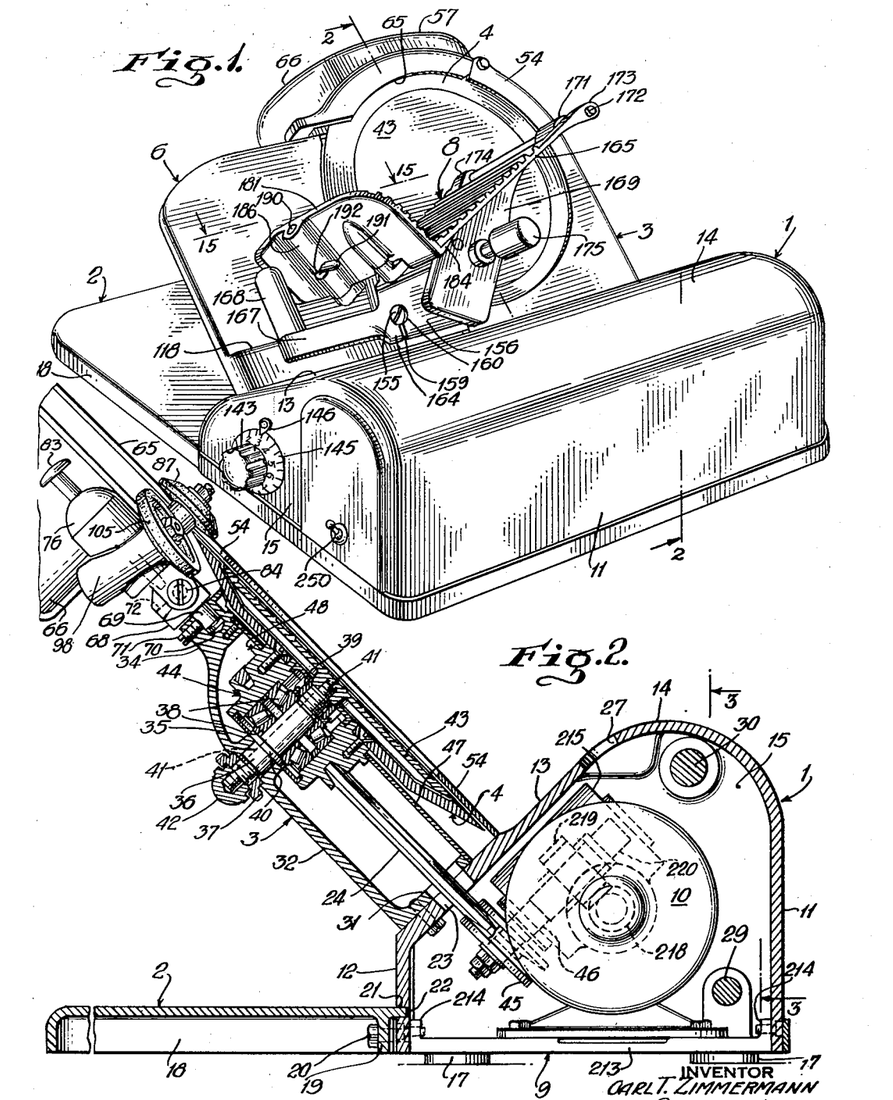
Fig. 1 is a perspective of the completed machine made according to one embodiment.
Fig. 2 is a section on the line 2—2 of Fig. 1.
Figure 8:
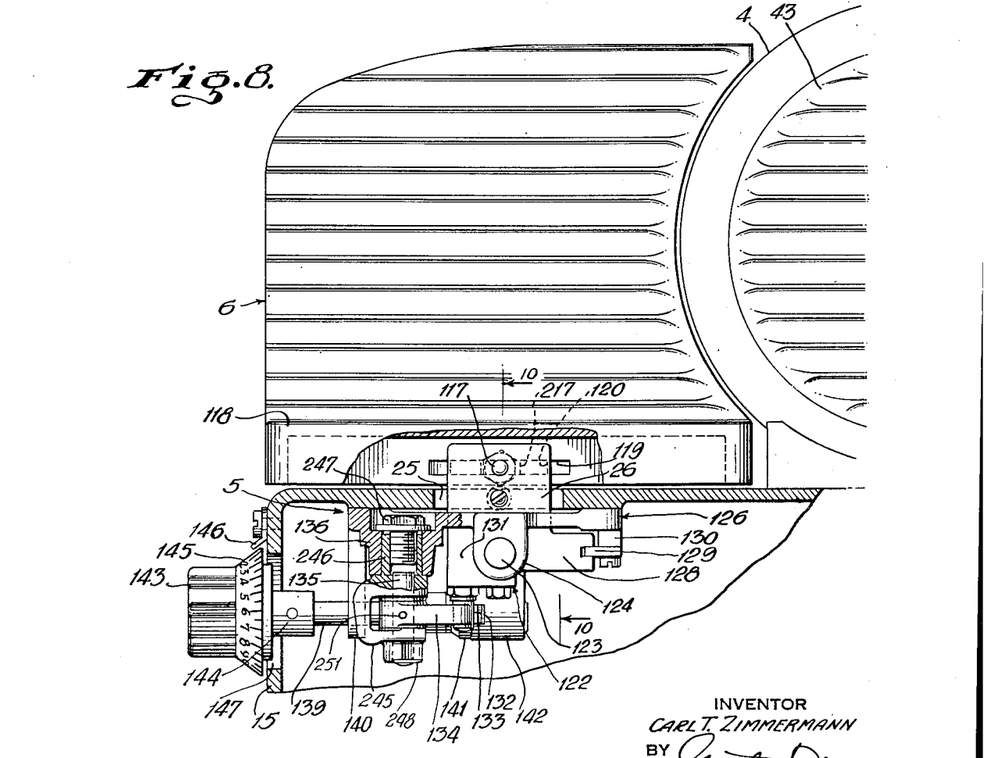
Fig. 8 is a fragmental view partly in section on the line 8—8 of Fig. 4.
Figure 9:
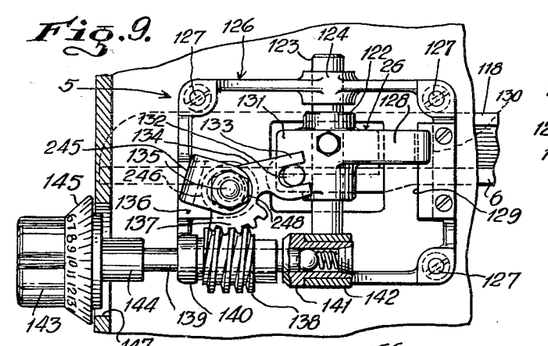
Fig. 9 is a section on the line 9—9 of Fig. 4.
Figure 10:
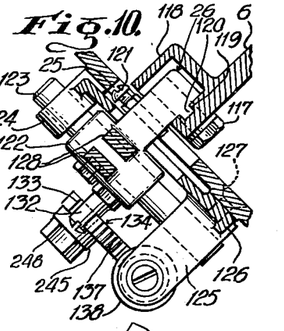
Fig. 10 is a section on the line 10—10 of Fig. 8.

The housing 1 is preferably open at the bottom as shown in Fig. 2 to afford access to the interior of the housing 1 and is also provided with three openings formed in the inclined wall 13, one opening 23 to the left hand of the wall 13 to form a clearance for the belt 24 drivingly connected to the motor 10, a second opening 25, see Fig. 8, to accommodate the arm 26 of the gauge plate 6 to the right of the opening 23, and an extended opening 27 above the openings 23 and 25 to clear the arm 28 of the hanger 7. Adjacent the inner face of the lower end of the rear wall 11, there is fixed the lower guide rod 29 and slightly forward of the guide rod 29 and adjacent the inner face of the rounded wall portion 14 there is fixed the upper guide rod 30. The guide rods 29 and 30 are secured in the end walls 15 as shown in Fig. 2.

Knife and associated parts

The frame 3 has a flange 31 extending inwardly and upwardly from the front wall 32 of the frame 3 and is secured by screws or the like through the lower end of the inclined wall 13 with the frame 3 surrounding the opening 23. The front wall 32 of the frame 3 merges into the end walls 33 of the frame 3 and into the diminished neck portion 34 at the outer end of the frame 3. Preferably the wall 32 extends at an angle of about 45° to the vertical and is provided with a boss 35 to receive the sleeve 36 which is locked in the boss 35 by the locknut 37. On the sleeve 36 are mounted the roller bearings 38 which are clamped by the jam nut 39 against the shoulder 40 on the sleeve 36. The pulley 44 is rotatably mounted on the roller bearings 38. The plate 43 which fits into the recess of the knife 4 has screw threadedly connected thereto the end of the pin 41 which passes through the sleeve 36, and by means of the nut 42 is locked in its position. In view of the foregoing, in order to remove the knife for replacement or the like, it is only necessary to remove the nut 42 when the pin secured to the plate 43 is free to be withdrawn. Thereupon the screws connecting the blade 4 to the pulley 44 may be removed in the usual way. The pulley 44 is connected by the belt 24 to the pulley 45 on the free end 46 of the shaft 220 of the reduction gearing hereinafter to be described.

Below the knife 4 and in order to protect the belt 24 from particles of food being cut from the knife and dirt, there is provided the plate 47 which engages the upper edge of the flange 31, the upper edges of the end walls 33 and the upper face of the neck 34, and in turn is in slidable engagement with the inner periphery of the recess between the annular shoulder 48 and the lower face of the knife 4. The pulley 44 in turn is rotatably mounted by means of the roller bearing units 49 on the sleeve 36.

The neck 34 has a lateral extension 50 provided with a recess 51 to receive the pin 52 provided at one end with a head 53 engaging the upper face of the guard 54 and provided with a clamping nut 55 screw threadedly connected to the other end of the pin 52 to engage the lower face of the extension 50, the arm 56 of the combination guard and casing 57 being disposed between the bifurcated end 58 of the guard 54. The guard 54, see Figs. 1, 3 and 5, extends around and covers about one-half of the cutting edge of the knife 4. It is secured in place against the upper end of the inclined wall 13 by the spring pressed projection 59, see Fig. 11, mounted on the lever 60 pivoted at 61 to the guard 54 and provided with a spring 62 normally urging the projection 59 outwardly so that when the guard 54 is moved into the position shown in Fig. 11, the projection 59 will enter the recess 63 in the wall 13 when the pin 52 enters the recess 51 in the extension 50 of the neck 34.

Figure 11:
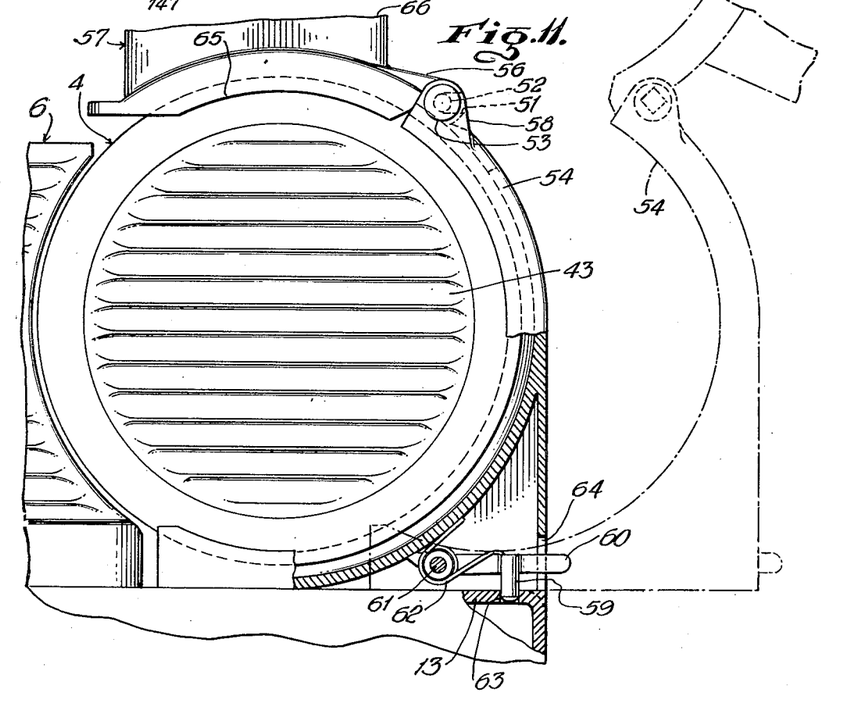
Fig. 11 is a fragmental plan partly in section showing the knife and its associated parts including its removable guard.
Figures 12, 13, 14:
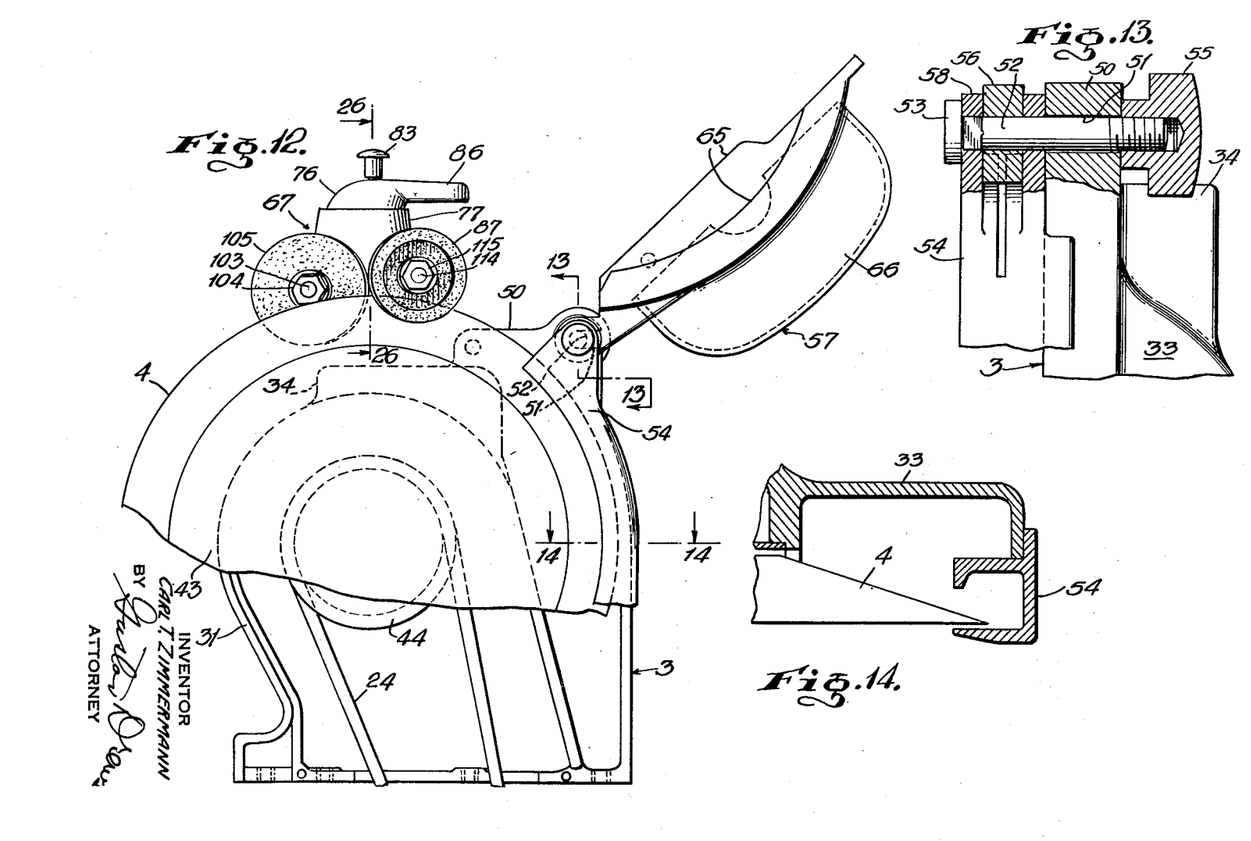
Fig. 12 is a fragmental plan of the knife unit showing its drive and the casing for the sharpening unit.
Fig. 13 is a section on the line 13—13 of Fig. 12.
Fig. 14 is a section on the line 14—14 of Fig. 12.

When it is desired to remove the guard 54, see Fig. 11, it is only necessary to flex the arm 60 upward to cause the projection 59 to clear the recess 63 and to loosen the nut 55 when the guard 54 can be removed. The dash and dot line position of the guard 54 in Fig. 11 is merely indicative of its removability from the knife 4. The guard 54 as shown in Fig. 11 is provided with an opening 64 through which the end of the lever 60 extends to enable the operator to actuate the same.

Figure 3:
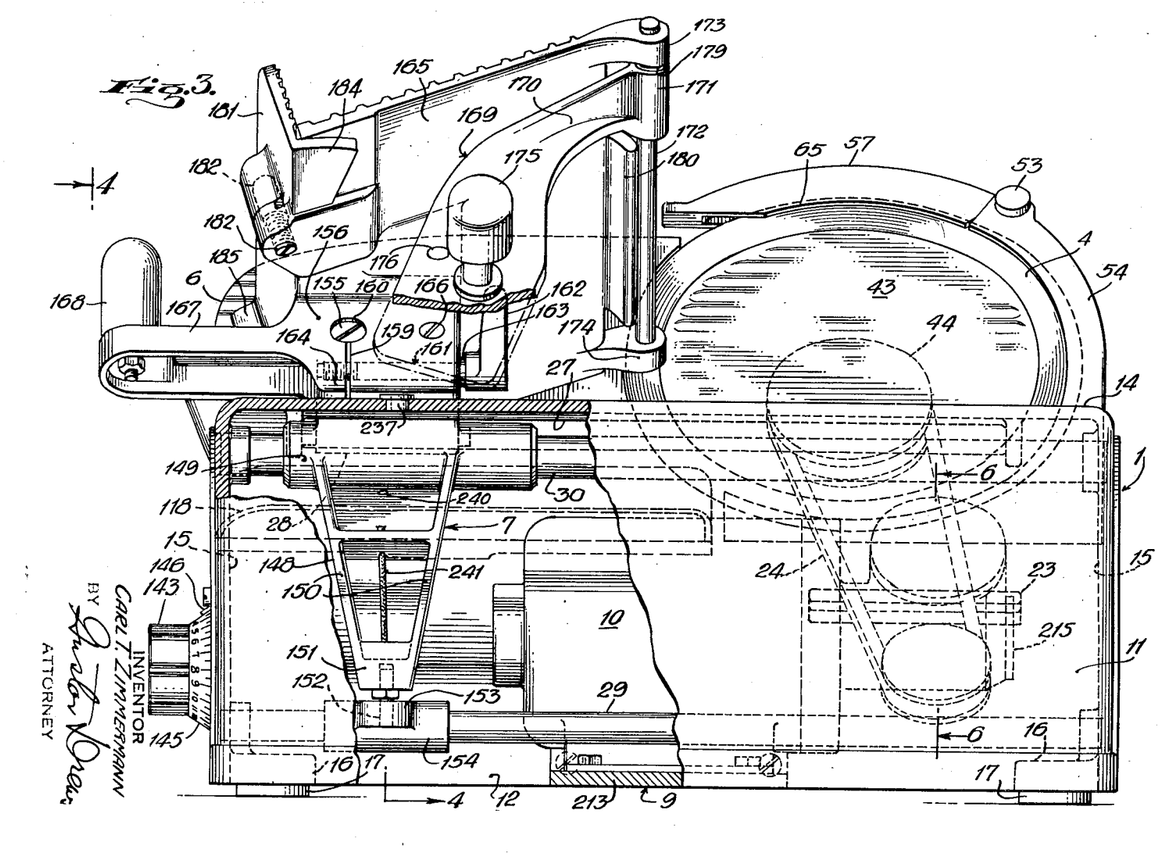
Fig. 3 is an enlarged rear elevation with parts broken away and shown in section on the line 3—3 of Fig. 2.
Figure 4:
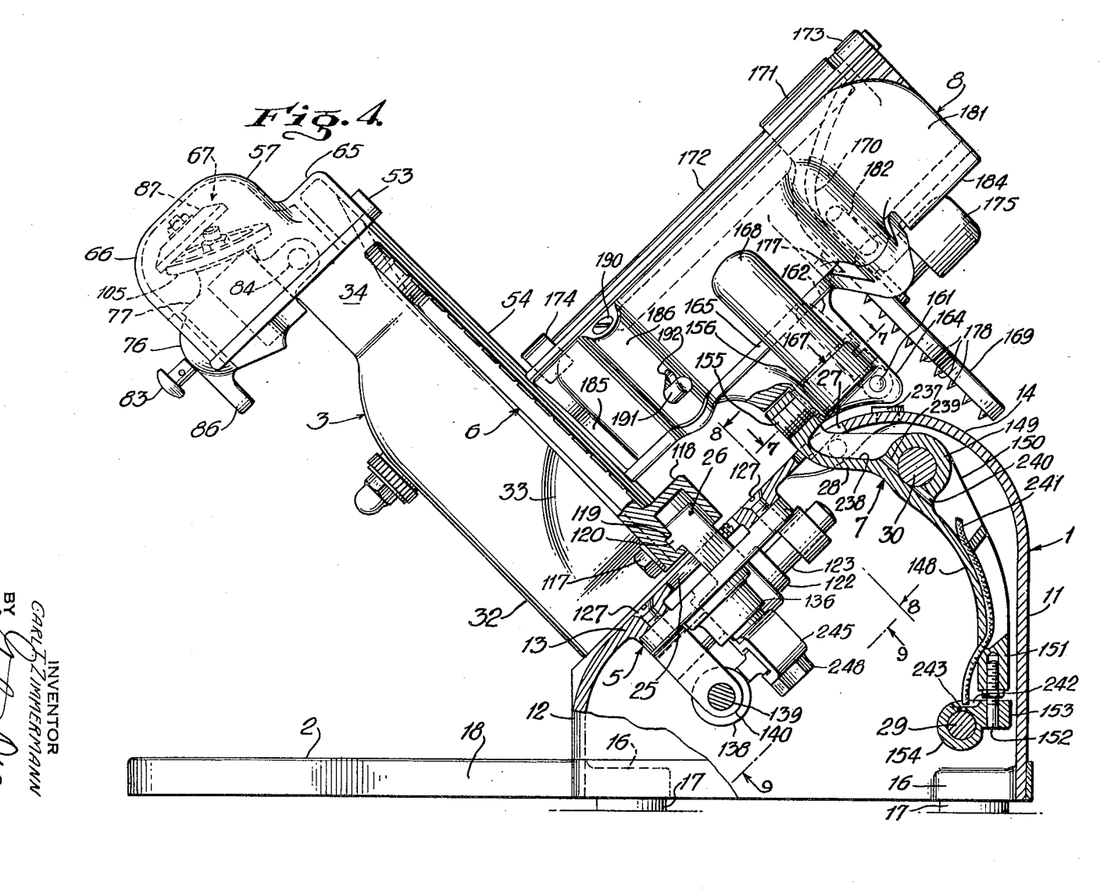
Fig. 4 is an end elevation partly in section on the line 4—4 of Fig. 3.
Figure 5:
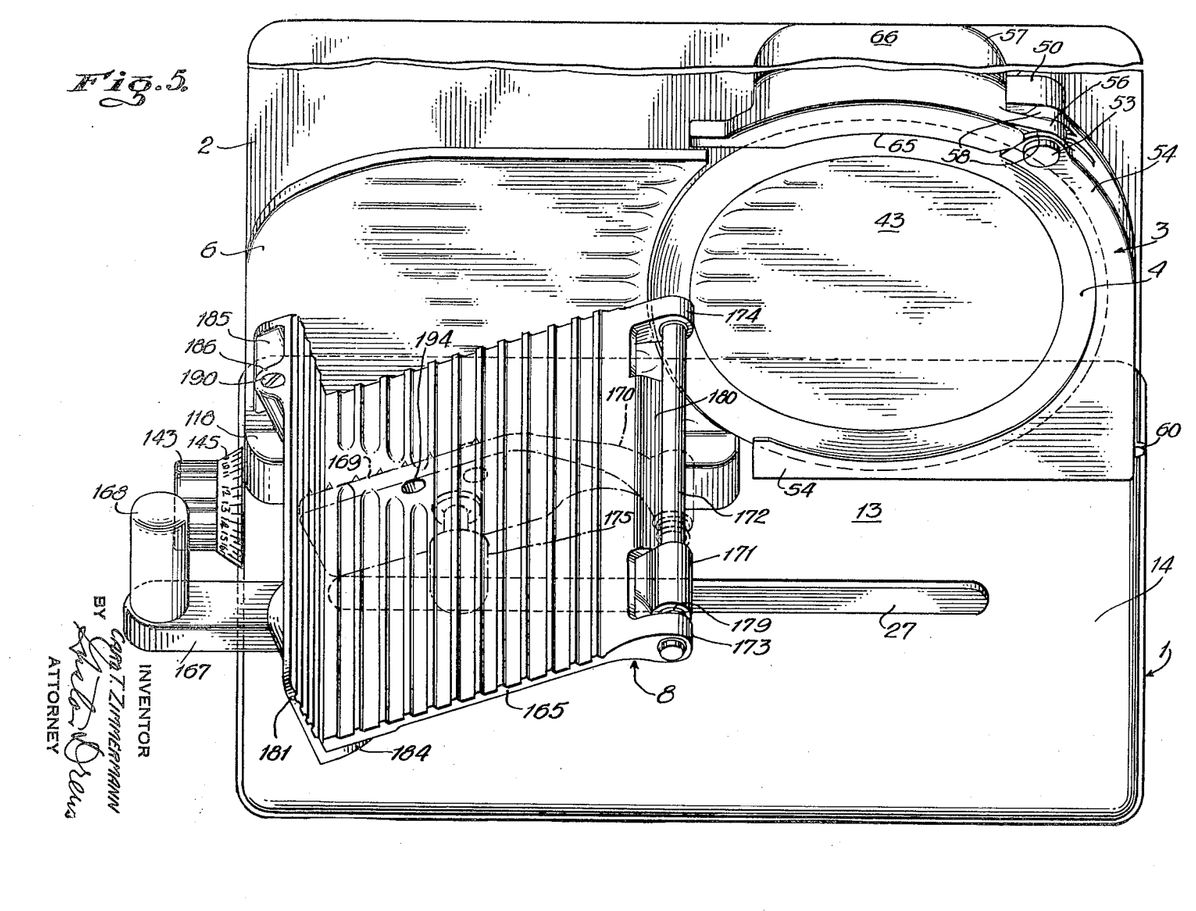
Fig. 5 is a plan view with a part broken away on the scale shown in Fig. 3.

The casing 57, see Figs. 1, 3 and 5, includes a knife guard portion 65 and a cover 66 for the sharpening unit 67, see Figs. 24 to 27, inclusive. The sharpening unit 67, see Figs. 2 and 25, has a base 68 provided with a stud 69 which is positioned in the opening 70 in the neck 34 of the casing 33, and is secured in position by the set screw 71. The distance of the base 68 from the neck 34 will depend upon the wear on the cutting edge of the knife 4. In other words, when the knife is new, the distance will be the greatest. This base or block 68 has two tapered recesses 72 and 73 to receive the tapered end 74 on the end of the pin 75, slidably mounted in the plug 76, rotatably mounted in the housing 77 which is fulcrumed to the base 68 at 84. In the housing 77 is mounted the gear 78 secured to the extension 79 of the plug 76, which gear 78 in turn is positioned by the ring 80 pinned to the housing 77. The plug 76, gear 78 and housing 77, have alined openings to slidably receive the enlarged end of the pin portion 74 and also to receive the spring 81 tensed between the end of the pin portion 74 and the shoulder 82 to cause the tapered end 74 to project either into the opening 72 or 73 when alined with the same. For disengaging the positioning pin 74 from either the recess 72 or the recess 73, there is provided the knob 83, which is pinned to the outer end of the pin 75. The tapered openings 72 and 73 cooperate with the tapered pin 74 to insure that the unit will not vibrate when the pin 74 engages either recess as now to be described. The recesses 72 and 73 determine the two positions of the sharpening unit 67. When the pin end 74 is positioned in the recess 72, then the sharpening unit will be out of sharpening position, to wit, that shown in Fig. 4. On the other hand, when the pin end 74 engages the recess 73 the sharpening unit 67 will be in sharpening position, that shown in Fig. 12 and Figs. 24 to 27, inclusive. For maintaining the gear 78 in normal inoperative position, the spring 85 is provided secured at one end to the plug 76 and at the other end to the cylindrical portion 77. In order to actuate the gear 78 into operative position of the sharpening unit, the handle 86 is formed on the plug 76 by means of which handle 86 the plug 76 is turned relative to the cylindrical portion 77 against the tension of the spring 85 to move the gear 78 into wheel engaging position of the sharpening unit 67. The sharpening unit will only be maintained in wheel engaging position while the handle 86 is swung over against the tension of the spring 85 where the sharpening wheels now to be described will engage the cutting edge of the knife 4 and the moment that the pressure on the handle 86 is released, the handle will return to normal inactive position, turning the gear 78 with it, and in turn removing the sharpening wheels from the cutting edge of the knife 4. There are in the present instance, provided two sharpening wheels similar to the sharpening unit disclosed in United States Letters Patent No. 2,069,431 issued February 2, 1937, to John J. Waage. The left sharpening wheel 87 functioning as a honing wheel in the present instance is preferably composed of a suitable oil stone and is mounted on the shaft 88 which in turn is slidably mounted in the cylindrical portion 89 having teeth 90 thereon in engagement with the teeth of the gear 78. The cylindrical portion 89 is chambered at one end to receive the spring 91 tensed between the head of the screw 92 on the shaft 88 and the ball bearing unit 93 at the inner end of the chamber, by means of which spring 91 the shoulder 94 is normally spaced from the bushing 95 where the honing wheel 87 will clear the cutting edge of the knife 4 in the position shown in Fig. 24 when the handle 86 is free and positioned by the spring 85. Preferably between the enlarged end of the bushing 95 and the free end of the chambered portion 89, there is provided the nut 96 to facilitate locking the bushing 95 in position and thereby determining the normal position of the honing wheel 87 according to the wear on the cutting edge of the knife 4, when the handle 86 is positioned by the spring 85.

Figures 24, 25, 26:
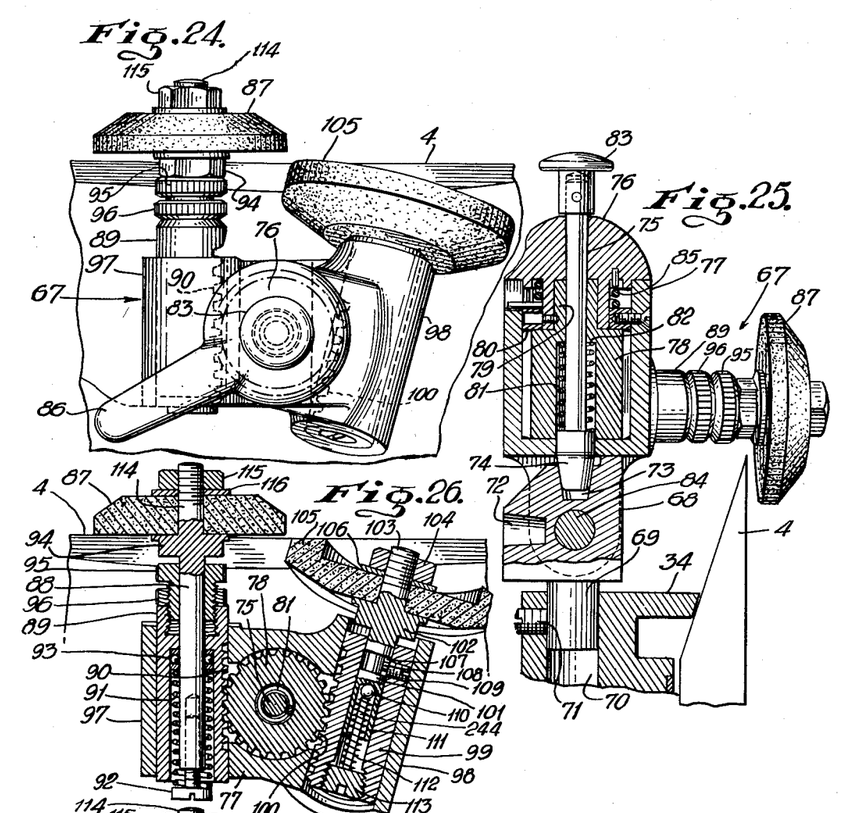
Fig. 24 is an enlarged fragmental view of the sharpening unit moved into position for engaging the cutting edge of the knife, but before engaging the cutting edge of the knife.
Fig. 25 is a section in part on the line 2—2 of Fig. 1 showing the means for adjusting the sharpening unit as the cutting edge of the knife wears.
Fig. 26 is a section on the line 26—26 of Fig. 12 with the honing and grinding wheels in contact with the cutting edge of the blade.

The cylindrical portion 77 is provided with a chambered extension 97 to receive the cylindrical portion 89. This portion 77 also has a chambered extension 98 to receive the cylindrical portion 99 having teeth 100 to mesh with the teeth of the gear 78. The cylindrical portion 99 receives the shank 101 having an enlarged head 102 terminating in a threaded portion 103 for the nut 104. Between the nut 104 and the grinding wheel 105 is disposed the washer 106, the grinding wheel 105 being disposed between the washer 106 and the enlarged head 102 of the shank 101. The shank 101 has an annular recess 107 to receive the projection 108 at the end of the screw 109, screw threadedly secured in the cylindrical portion 99 and determining the axial movement of the shank 101 relative to the cylindrical portion 99. The shank 101 is also chambered to receive the ball 110 resiliently maintained at the end of the chamber 111 in the shank 101 by the spring 112 tensed between the ball 110 and the nut 113 screw threadedly connected at the end of the central chamber of the cylindrical portion 99. There is also interposed between the ball 110 and the nut 113 a rod 244 long enough to cause a positive engagement of the wheel 105 against the knife 4 after the wheel 87 has engaged the knife 4. As shown in Fig. 26, the gear 78 has been rotated in a counter-clockwise direction in order to move the wheel 87 downwardly into spring pressed contact with the knife 4 against the tension of the spring 91. As soon as this contact has been established the clearance between the pin 244 and the ball 110 will have been taken up so that upon further rotated movement of the gear 78 the grinding wheel 105 will be positively brought into engagement with the knife 4. During this latter rotative movement, the spring 91 of the honing wheel 87 will be further compressed.

Figure 27:
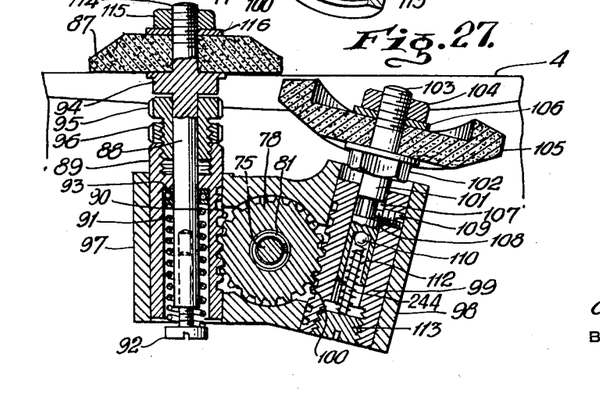
Fig. 27 is a fragmental section similar to that shown in Fig. 26, but with the grinding wheel clear of the cutting edge of the knife while the honing wheel is still in engagement with the cutting edge of the knife.

When reversing the direction of rotation of the gear 78 into the position shown in Fig. 27, the downward movement of the cylindrical portion 99 will cause a clearance between the pin 244 and the ball 110 without freeing the grinding wheel 105 from the knife 4. In other words, the grinding wheel 105 will continue in contact with the knife 4 until the pin 108 engages the lower end of the recess 107 at which time the cylindrical portion 99 will have pulled the grinding wheel 105 positively away from the knife 4 while the honing wheel 87 is still in contact due to the spring 91. Finally when the shoulder 94 engages the bushing 95, the honing wheel 87 will clear the knife 4. In other words, when the handle 86 is released and its position determined by the spring 85, both the honing wheel 87 and the grinding wheel 105 will clear the cutting edge of the knife 4. The adjustment of the clearance between the shoulder 94 and bushing 95 by manipulation of the bushing 95 will determine the position of the honing wheel 87 and grinding wheel 105 relative to the knife 4 when the handle is turned, see Fig. 24, in a counter-clockwise direction. By means of this adjustment as is desired the honing wheel 87 may with facility be caused first to engage the cutting edge of the knife 4, followed by the engagement of the cutting edge of the knife 4 by the grinding wheel 105, and in turn when the handle is released, the grinding wheel 105 will clear the cutting edge of the knife 4 before the honing wheel 87 clears the cutting edge of the knife 4 to prevent the formation of burrs.

This sharpening unit is primarily distinguished by the adjustment of the bushing 95. By means of the bushing 95 and the locknut 96, the distance between the shoulder 94 and bushing 95 can be quickly adjusted to accommodate wear on the cutting edge of the knife 4 without the use of any tools or the like.

The honing wheel 87 in the present instance is mounted on the threaded end 114 of the shank 88 which has a nut 115 and a washer 116, the washer being disposed between the nut 115 and the honing wheel 87, and the honing wheel 87 in turn being disposed between the enlarged shoulder 94 and the washer 116. In the present instance, the screw 92 is screw threadedly connected to the free end of the shank 88.

*Gauge plate and control means*

The gauge plate 6, see Figs. 4, 8, 9 and 10, is secured by the bolt 117 to the arm 26 which extends through the opening 25. The gauge plate preferably has an angle plate 118 extending upwardly from the gauge plate 6 and rearwardly to cover the arm 26. This angle plate 118 preferably extends the full width of the gauge plate 6, see Fig. 8, and is rounded at its ends merging into the upper face of the plate 6. The plate 6 preferably has an elongated recess 119 to receive the projection 120 of the arm 26 to guide the plate 6 and to be adjusted laterally relative to the arm 26. The bolt 117 extends through an elongated slot 217 in the gauge plate 6 and is screw threadedly connected to the arm 26. The arm 26 also has a stop screw 121 extending therethrough with its head end cooperating with the upper edge of the opening 25 as a stop to determine the uppermost position of the arm 26 and therewith of the plate 6.

The arm 26 is provided with a boss 122 secured on the rod 123 which is slidably mounted in the bearings 124 and 125 of the frame 126. This frame or bracket has in the present instance screw receiving openings at its corners to receive the screws 127 extending through the inclined front wall 13 into the corners of the frame 126. By means of these screws 127, the frame 126 with the arm 26 and parts now to be described, can be removed as a unit after the gauge plate 6 has been removed from the arm 26 by withdrawing the bolt 117.

The boss 122 is provided with an arm 128 bifurcated at its ends, see Fig. 8, slidably to receive the guide plate 129 fastened to a raised portion 130 extending from the frame 126. The boss 122 is also provided with an extension 131 having a pin 132 to receive the bifurcated end 133 of the lever 134 journalled on the pin 135. The pin 135 is mounted in the bracket 245 which has an eccentric portion 246 journalled in the extension 136 formed on the bracket 126. The lever 134 has a mutilated worm wheel 137 in mesh with the worm 138 on the shaft 139 journalled in the bearings 140 and 141, the bearing 140 being formed on the frame 126 and the bearing 141 being mounted on the sleeve 142 formed on the frame 126. The shaft 139 has secured on the end of it the control knob 143, the control knob 143 having a sleeve 144 which is pinned to the shaft 139. The control knob 143 preferably has an inclined graduated dial 145 cooperating with the pointer 146 formed on the end wall 15, the sleeve 144 being positioned in the opening 147 and the dial 145 preferably having a greater diameter than the opening 147 in the interest of design. The axis of the pin 135 constitutes the pivotal center of the lever 134. This pin 135 extends through the bifurcation of the bracket 245 and through the lever 134, being pinned to the lever 134 by the tapered pin 251. The bracket 245 has an eccentric sleeve 246 adjustably mounted in the extension 136. After adjustment has been effected, the bracket 245 is anchored against movement relative to the extension 136 by the screw 247 screw threadedly connected to the inner face of the sleeve 246 and drawing the bracket 245 tightly against the extension 136. The eccentric sleeve 246 is provided primarily to facilitate accurately meshing the teeth of the worm wheel 137 with the teeth of the worm 138. In order to effect this adjustment, the screw 247 is initially turned to loosen the bracket 245 whereupon the head 248 of the bracket 245 is turned to move the center of rotation of the lever 134 to or from the axis of the shaft 139.

*Chute and hanger*

The hanger 7 shown in section in Fig. 4 mounted on the guide rods 29 and 30 consists essentially of a bracket 148 having a sleeve 149 slidably mounted on the guide rod 30, two diverging webs 150 terminating in the enlargement 151 in which is screw threadedly secured the pin 152 which is slidably mounted in the extension 153 on the sleeve 154 slidably mounted on the guide rod 29. The arm 28, see Figs. 4 and 7, extends forwardly and upwardly from the sleeve 149 and has screw threadedly secured thereto the post 155 to slidably receive the extension 156 of the chute. This extension preferably has a pin 157, see Fig. 7, which fits in the recess 158 in the arm 28 to aline the chute. The extension 156, see Figs. 1 and 3, has a slot 159 therein in communication with the opening 160 for receiving the pin 155. Through this extension 156 extends the rod 161 having a lever 162 on the outer end thereof and a shoulder 163 engaging the outer face of the extension 156. The inner end of the rod 161 is screw threadedly connected to the portion 164 of the extension 156 so that when the lever 162 is turned it will cause the two portions of the extension 156 to either side of the slot 159 acting as jaws to approach one another and securely engage the pin 155. Here again, without the use of tools but merely by the movement of the lever 162 the chute can be removed since the chute now to be explained is formed on the extension 156.

The extension 156 in the present instance is formed on the rear of the substance carrying plate 165 which in the present instance constitutes the main support for the substance to be moved to and from the cutting edge of the knife 4. The plate 165 preferably extends vertically to the plane of the knife 4 and its lower edge ordinarily is disposed fairly close to the cutting edge of the knife 4. In order to adjust the distance of the lower edge of the plate 165 to the knife 4, the pin 157 through its screw threaded end 166 may be adjusted, that is, the pin may be caused to extend a greater or less distance from the extension 156.

In the present instance, the extension 156 has extending therefrom the arm 167 on which is formed the handle 168 for engagement by the operator to move the chute to and from the cutting edge of the knife. On one end of the plate 165 there is preferably hingedly supported the end weight 169 such as disclosed in United States Patent No. 2,085,519. This end weight 169 preferably has an arm 170 having a sleeve 171 slidably mounted on the rod 172 secured in the enlargements 173 and 174 at the upper and lower ends of the free end of the plate 165. Preferably the end weight 169 has a handle 175 extending therefrom in order to lift the end weight 169 and swing it either to the front of the plate 165 into engagement with the substance to be sliced, or rearward into position shown in Fig. 3 where it is resiliently anchored, see Fig. 17, by engagement of the cup 176 with the spring pressed ball 177 anchored in the extension 156.

The lower face of the end weight 169 preferably has pins or projections 178 formed thereon to engage the substance to be cut.

The plate 169 is locked by the spring pressed ball 177 cooperating with the cup 176 due to the tension in the spring 179 mounted on the rod 172 and exercising a downward pressure on the sleeve 171 when the arm 170 is moved upwardly against the sleeve 173 to clear the plate 180 extending rearwardly from the side edge of the plate 165. The spring 179 also acts as a snubber or cushion to take up the shock when the arm 170 is moved upwardly into position shown in Fig. 15.

Figures 15, 16, 17, 18:
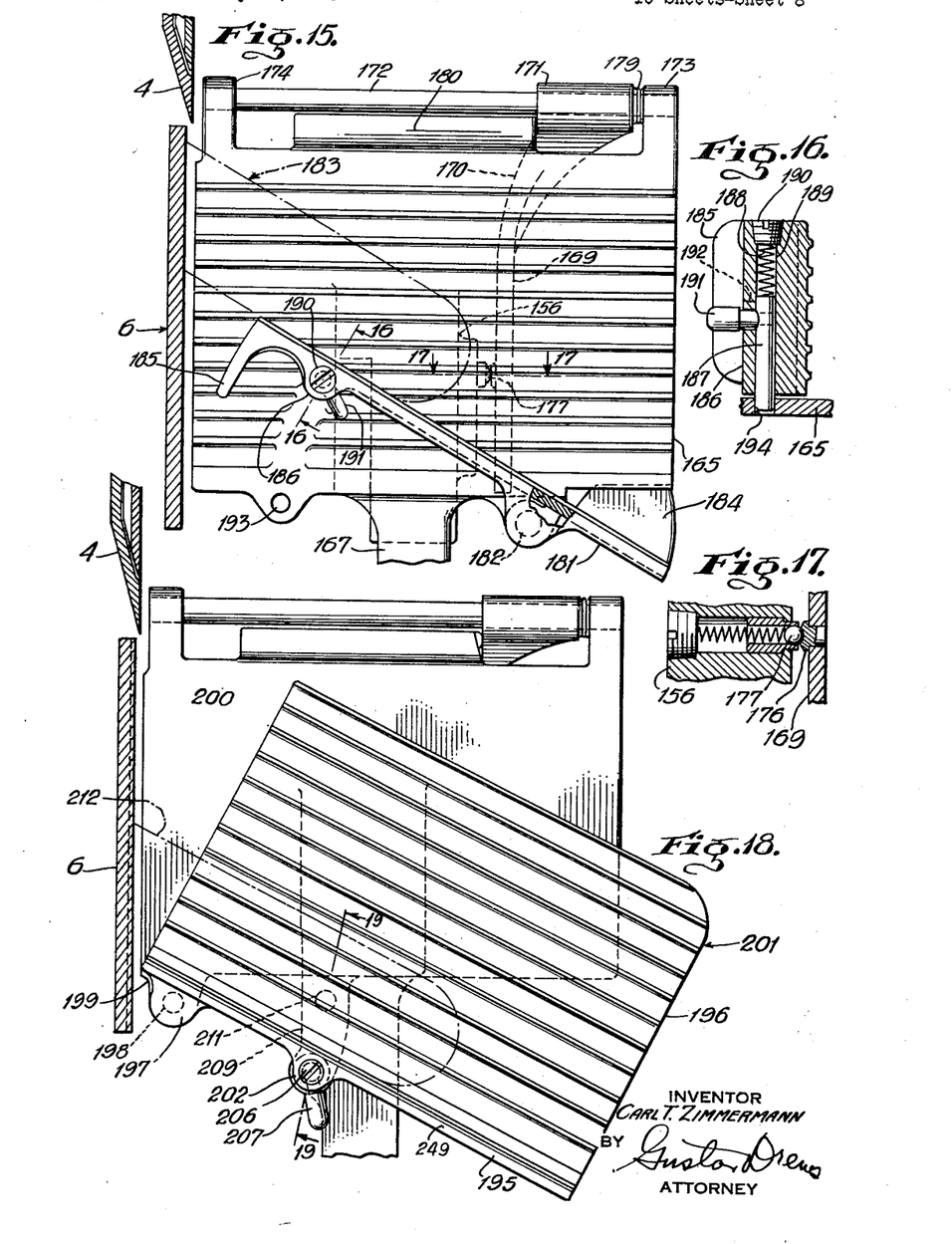
Fig. 15 is a section on the line 13—13 of Fig. 1, but with the adjustable plate inclined relative to the position shown in Fig. 1.
Fig. 16 is a section on the line 16—16 of Fig. 15.
Fig. 17 is a section on the line 17—17 of Fig. 15.
Fig. 18 is a modification of the unit shown in Fig. 15.

In the embodiment shown in Figs. 1, 3, 4, 5, 15 and 16, the plate 165 constitutes one wing of the chute, and the plate 181 constitutes the other wing which in this embodiment is movable relative to the plate 165. Although the plate 181 is substantially vertical to the plate 165 at all times, and the plate 165 is substantially vertical to the plane of the knife 4 at all times, the plate 181, see Figs. 3 and 15, is pivotally mounted on the pin 182 so that it can be swung from a position at right angles to the plane of the blade to an inclined position forming an angle of about 60° with the plane of the knife 4. When the plate 181 is so tilted, see Fig. 15, it is particularly adapted for slicing small articles of food, such as bologna and the like at an angle to the axis of the bologna in accordance with the practice. In Fig. 15 the dash and dot line 183 is there illustrative of the outline of a piece of bologna, when supported by the plates 165 and 181 and when the plate 181 is inclined relative to the plane of the knife 4. This pivot pin 182 in the present instance is positioned about one-third of the height of the plate 165 from its upper outer free end. When so positioned, the lower end of the plate 181 will clear the gauge plate 6, but effectively cooperate with the plate 165 to support the piece of bologna 183 at the desired inclination to engage the cutting edge of the knife 4. The upper end of the plate 181 may have a flange 184 extending at right angles thereto and in alinement with the rear face of the plate 165. This flange 184 will cooperate with the plate 181 properly to support the substance being cut when the plate 181 is swung into the inclined position as shown in Fig. 15.

Preferably to protect the hand of the operator, when the plate 181 is tilted as aforesaid, the lower end of the plate 181 is provided with a finger piece 185 so that when the attendant is operating the machine he may with his right hand engage the plate 181 to move the chute to and from the cutting edge of the knife 4 and position the thumb of his right hand in the finger piece 185 to leave free the other four fingers of his right hand to engage the substance being cut, such as the bologna 183. In this way, the finger piece 185 serves as a guide to the operator so that he will not bring his fingers down low enough to touch the cutting edge of the knife 4.

Above the finger piece 185 in the present instance, there is formed an enlargement or boss 186, see Fig. 16, in which is slidably mounted the pin 187 extending from one end of the enlargement 186, as shown in Fig. 16 and engaging the spring 188 at its other end, which spring 188 is disposed in the opening 189 between the inner end of the pin 187 and the closure 190 to exercise a yieldable urge on the pin 187 in a downward direction. To the pin 187 there is secured the projection 191 which extends outward through the cammed slot 192, see Figs. 1 and 4. The pin 187 when extended may enter either the recess 193, Fig. 15, or the recess 194, Fig. 5. When the pin 187 is disposed in the recess 193, it will be locked in the position shown in Fig. 5, and in turn when it is disposed in the opening 194 it will be locked in the position shown in Fig. 15. The cam slot 192 enables the projection 191 by a rotating motion to move the pin 187 into and out of extended position against the tension of the spring 188.

While the position of the pin 182 of the plate 181 has certain advantages, obviously this pivot pin may be disposed nearer to the gauge plate 6 when the lower end of the plate 181 will not be spaced from the gauge plate 6 as far as it is in the present instance when swung into the inclined position shown in Fig. 15. Still furthermore, the distance that the pin 182 may be spaced from the gauge plate 6 may be varied without departing from the general spirit of the invention.

Obviously other modifications of the plates 165 and 181 may be made to enable the attendant quickly to convert the chute for cutting articles of food, such as bologna, without departing from the general spirit of the invention. As an instance, in Figs. 18 and 19 the modification there shown includes a short plate 249, having secured thereto the corrugated plate sections 195 and 196 which form a dihedral angle with one another. The plate 249 has an extension 197 adjacent the gauge plate 6 which is pivotally connected by the pin 198 to the extension 199 of the plate 200, the plate 200 in this embodiment being removably secured to the arm 28 and the chute 201 including the plate 249 and corrugated plate sections 195 and 196 being pivotally connected to this plate 200, with the section 196 parallel to and slidably mounted across the upper face of the plate 200, and the section 195 secured to the plate 249 as a facing plate for the plate 249 and substantially perpendicular to the section 196. In order to anchor the chute 201 either in the inclined position shown in Fig. 18, or in the vertical position where it alines with the plate 200, there is provided a boss or enlargement 202, see Fig. 19, extending from the rear face of the plate 249 which is chambered to receive the pin 203 adapted to extend from one end of the boss 202 and in engagement with the spring 204 at its inner end, which spring 204 is mounted in the chamber 205 in the boss 202 between the inner end of the pin 203 and the closure pin 206. The pin 203 has a projection 207 formed thereon and extending outwardly through the cam slot 208 similar to the cam slot 192 shown in Fig. 1. In the arm 209 extending from the plate 200, see Fig. 19, there are formed two openings 210 and 211. When the pin 203 engages the outer recess 210, the chute 201 including both the plate sections 195 and 196 will be inclined to the gauge plate 6 so that the two plate sections 195 and 196 of the chute 201 as a unit will act to support a small piece of substance, such as a bologna, see the dash and dot line 212 illustrative of a piece of bologna in Fig. 18, in an inclined position similar to the position of the object 183 shown in Fig. 15. When it is desired, however, to slice a larger piece of produce, such as a ham, the chute 201 may be swung over into position where its two plate sections 195 and 196 are vertical to the gauge plate 6 and in such position the pin 203 will engage the opening 211.

*Motor and supporting frame*

Figure 6:
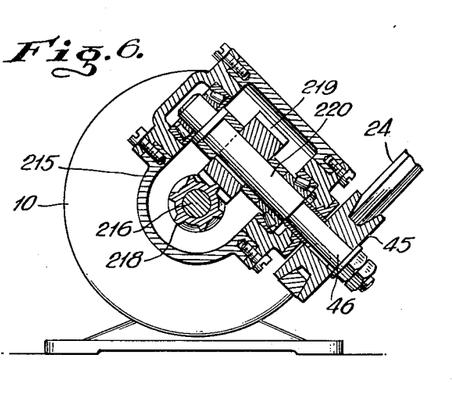
Fig. 6 is a section on the line 6—6 of Fig. 3.
Figure 7:
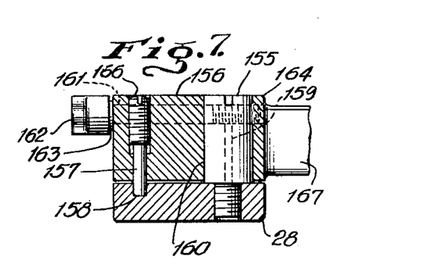
Fig. 7 is a section on the line 7—7 of Fig. 4.

The frame 9, motor 10 and associated parts now to be described also constitute a removable unit which can be removed from the housing 1 for repair or the like without affecting any of the other parts except to disconnect the belt 24 from the pulley 45. The motor 10, shown in Figs. 2, 3 and 6, is mounted upon a frame including the crossplate 213 provided with flanges 214 secured to the front wall 12 and rear wall 11 by suitable screws as shown in Fig. 2. To one side of the motor 10 and secured to the motor housing, there is provided the housing 215 for reduction gearing. The motor 10, as an instance, has a shaft 216 having a worm 218 thereof in mesh with the worm wheel 219 on the shaft 220 journalled in the housing 215 with the pulley 45 mounted on the extending free end 46 of the shaft 220, the pulley 45 being connected as aforesaid by the belt 24 to the pulley 44. When it is desired to remove the motor 10, it is only necessary to release the belt 24 from the pulley 45 and then either to remove the screws connecting the flanges 214 of the plate 213 to the vertical walls 11 and 12 of the housing 1, or else to remove the nuts connecting the base 221 to the plate 213.

*Modification of knife guard*

Figures 19, 20, 21, 22, 23:
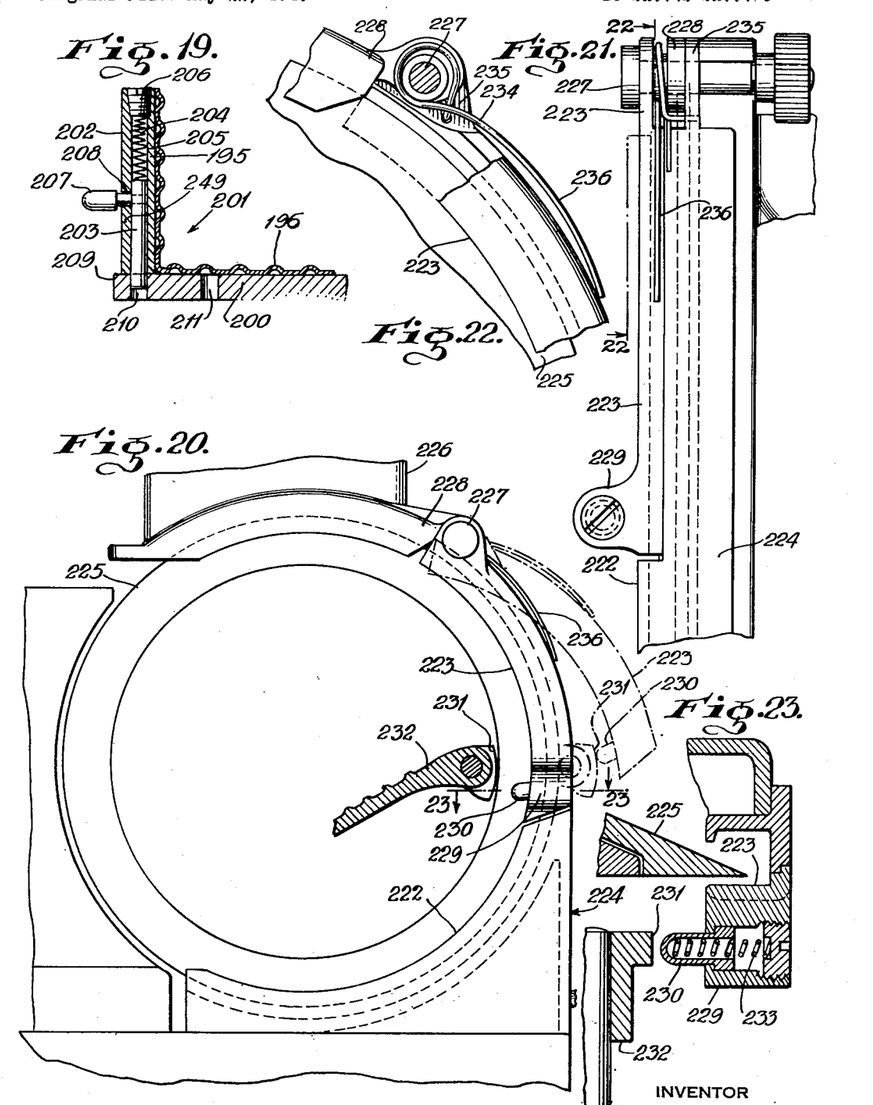
Fig. 19 is an enlarged fragmental section on the line 19—19 of Fig. 18.
Fig. 20 is a fragmental plan view partly in section of the knife assembly showing a modification of the knife guard relative to the knife guard shown in Figs. 11 and 12.
Fig. 21 is an enlarged fragmental end elevation of the modification shown in Fig. 20.
Fig. 22 is a fragmental section on the line 22—22 of Fig. 21.
Fig. 23 is a fragmental section on the line 23—23 of Fig. 20.

In Figs. 20, 21, 22 and 23, there is shown a modification of the knife guard 54. In this embodiment the over-hanging portion of the guard is divided into two pieces, the fixed portion 222 and the movable portion 223. The fixed portion is integral with the main frame 224 and removable from the knife 225 in the same way that the frame 54 is removable from the knife 4. The combination housing and guard portion 226 is hingedly connected to the main frame 224 on the pin 227 in the same way that the housing 66 of the first embodiment is pivotally connected to the pin 52. In this instance, however, the movable portion 223 is also pivotally connected to the pin 227, and see Fig. 21, is disposed above the arm 228 of the housing 226. The movable portion 223 has a boss 229, in section in Fig. 23 and in plan in Fig. 20, which has a spring pressed projection 230 mounted therein to be engaged by the projection 231 on the chute 232. The projection 231 on the chute 232 is mounted at the free edge of the main plate of the chute so that when the chute 232 moves over the knife 225 and the projection 231 strikes the projection 230, it will initially compress the spring 233 of the projection 230 and then swing the movable guard portion 223 into the dash and dot line position shown in Fig. 20. In this way, a longer slice can be cut. Preferably, see Fig. 22, the movable section 223 is provided with a spring 234 coiled around the pin 227 with one end secured in the lower fixed portion 235 of the frame 224 and its arm 236 resting against the outer face of the movable section 223.

To facilitate lubricating the rods 30 and 29 for the hanger 7, an opening 237 is formed in the rounded portion 14 of the housing 1, see Figs. 3 and 4, and consequently when the hanger 7 is positioned beneath the opening 237 oil may be poured through the opening onto the hanger 7, the oil passing from the web 238 through the openings 239 to the rod 30 and then to the opening 240 to the wick 241 and from the wick 241 to the recess 242 above the opening 243 in the sleeve 152 and then to the rod 29.

Preferably also in the interest of manipulation by one and the same attendant, the switch 250 for the motor 10 is mounted in the right hand end wall 15 to the right of the control knob 143 so that the attendant may with his left hand actuate the control knob 143 and with his right hand first manipulate the switch 250 and then bring his right hand up to the handle 168 to actuate the substance carrier 8.

It has been found that an extremely compact machine can be produced when the plane of the knife and its associate parts form an angle approximating 45° to the vertical.

It has also been found that, when the plate 165 forms an angle of approximately 30° to the inclined wall 13, as the substance carrier 8 is moved across the knife 4, it will cooperate with the cutting edge of the knife to enable the cutting edge to press the meat between the plate 165 and therefore enhance the cutting effect of the cutting edge of the knife 4. This application is a division of applicant's Patent No. 2,538,073 dated January 16, 1951.

It is obvious that various changes and modifications may be made to the details of construction without departing from the general spirit of the invention as set forth in the appended claims.

I claim:

1. The combination in a slicing machine having a housing with a wall enclosing the rear, sides and inclined front thereof, a substance carrier having upwardly extending wings, a motor disposed in the housing, a knife frame connected to and extending upwardly at substantially a right angle to, and forwardly of, the inclined wall of the housing, a knife rotatably mounted in said frame at the inclination determined by said frame, and a gauge plate extending substantially at right angles to said wings and operatively connected to the housing to one side of the knife frame but substantially parallel to the plane of the knife, the wings of said carrier extending upwardly between said housing and said knife, characterized by, upper and lower horizontally extending rods having a space between the same located in the rear of said housing to determine the position of the rear wall of the housing, said motor located in said housing forwardly of the space between said rods and operatively connected to said knife, a hanger slidably mounted on said rods, there being an opening directly below the path of movement of the upper edges of the wings of the carrier and substantially centrally between the upper and lower edges of the carrier in the upper portion of the inclined front of the wall of said housing forwardly of the uppermost of said rod, and an arm of said hanger extending over, and forwardly of, said motor and through said opening above the level of said knife and gauge plate, said substance carrier being mounted on said arm and slidable with said hanger to and from the cutting edge of said knife in front of said frame, with the rear face of the housing free of any operating parts.

2. The combination as set forth in claim 1 in which a short sleeve is slidably mounted on the lower rod, the hanger including an elongated sleeve is slidably mounted on the upper rod and connected to said short sleeve, and an arm on said hanger extends forwardly through said opening above the level of said knife and gauge plate, said substance carrier being mounted on said arm in front of said housing to be actuated with said hanger to and from the cutting edge of said knife, with the rear face of the housing free of any operating parts.

CARL T. ZIMMERMANN.

REFERENCES CITED

The following references are of record in the file of this patent:

UNITED STATES PATENTS

| Number | Name | Date |
|---|---|---|
| 1,974,304 | Freudenberg | Sept. 18, 1934 |
| 2,355,487 | Van Berkel | Aug. 8, 1944 |
| 2,378,664 | Thomas | June 19, 1945 |
| 2,492,885 | Pfister et al. | Dec. 27, 1949 |